US009940316B2

(12) United States Patent
Miyashita et al.

(10) Patent No.: US 9,940,316 B2
(45) Date of Patent: Apr. 10, 2018

(54) DETERMINING USER INTEREST DATA FROM DIFFERENT TYPES OF INPUTTED CONTEXT DURING EXECUTION OF AN APPLICATION

(71) Applicant: SONY CORPORATION, Tokyo (JP)

(72) Inventors: Ken Miyashita, Tokyo (JP); Tomohisa Tanaka, Tokyo (JP); Jun Kimura, Kanagawa (JP); Osamu Ooba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 79 days.

(21) Appl. No.: 14/779,081

(22) PCT Filed: Jan. 17, 2014

(86) PCT No.: PCT/JP2014/050826
§ 371 (c)(1),
(2) Date: Sep. 22, 2015

(87) PCT Pub. No.: WO2014/162756
PCT Pub. Date: Oct. 9, 2014

(65) Prior Publication Data
US 2016/0048489 A1 Feb. 18, 2016

(30) Foreign Application Priority Data

Apr. 4, 2013 (JP) ................. 2013-078462

(51) Int. Cl.
G06F 17/27 (2006.01)
G06F 3/023 (2006.01)
(Continued)

(52) U.S. Cl.
CPC .............. G06F 17/24 (2013.01); G06F 3/048 (2013.01); G06F 17/276 (2013.01);
(Continued)

(58) Field of Classification Search
CPC ...... G06F 17/243; G06F 17/246; G06F 17/24; G06F 17/276; G06F 3/0237; G06F 3/04883; G06F 3/048
(Continued)

(56) References Cited

U.S. PATENT DOCUMENTS 5,805,911 A * 9/1998 Miller ................... G06F 17/276
715/234
7,254,569 B2 * 8/2007 Goodman ............. G06F 17/243
(Continued)

FOREIGN PATENT DOCUMENTS

JP 11-328317 11/1999
JP 2001-292394 10/2001
(Continued)

Primary Examiner — Cesar Paula
Assistant Examiner — Carl E Barnes, Jr.
(74) Attorney, Agent, or Firm — Paratus Law Group, PLLC

(57) ABSTRACT

Provided is an information processing apparatus to further improve convenience for a user, the information processing apparatus including: an update detection unit configured to detect update of presented information presented to a user during execution of an application; an interest data extraction unit configured to extract interest data that includes at least information accompanying the presented information whose update has been detected and is information on a target in which the user is interested during execution of the application; an input context detection unit configured to detect input context indicating a processing status of input information using the application, the input information being attempted to be inputted during execution of the application; and an input information candidate presentation unit configured to perform, on the basis of the input context, control to present input information candidates that are candidates of the input information among the interest data.

16 Claims, 11 Drawing Sheets

(51) Int. Cl.
  *G06F 17/24* (2006.01)
  *G06F 3/048* (2013.01)
  *G06F 17/30* (2006.01)
  *G06F 3/0488* (2013.01)

(52) U.S. Cl.
  CPC .... *G06F 17/30867* (2013.01); *G06F 3/04883* (2013.01); *G06F 17/243* (2013.01)

(58) Field of Classification Search
  USPC ................ 715/271, 220–221, 224, 256, 780
  See application file for complete search history.

(56) References Cited

U.S. PATENT DOCUMENTS

| | | | | |
|---|---|---|---|---|
| 8,504,437 B1* | 8/2013 | Agarwal | | G06F 17/30 |
| | | | | 705/14.54 |
| 8,677,236 B2* | 3/2014 | Bower | | G06F 3/0237 |
| | | | | 704/240 |
| 2003/0177289 A1* | 9/2003 | Wakatsuki | | G06F 17/276 |
| | | | | 710/1 |
| 2006/0259479 A1* | 11/2006 | Dai | | G06F 17/30867 |
| 2008/0126075 A1* | 5/2008 | Thorn | | G06F 3/0237 |
| | | | | 704/3 |
| 2009/0044623 A1* | 2/2009 | Matsumoto | | G06F 17/276 |
| | | | | 73/488 |
| 2009/0106695 A1* | 4/2009 | Perry | | G06F 17/24 |
| | | | | 715/816 |
| 2009/0276377 A1* | 11/2009 | Dutta | | G06Q 30/02 |
| | | | | 706/12 |
| 2010/0005095 A1* | 1/2010 | Yun | | G06Q 30/0601 |
| | | | | 705/26.1 |
| 2010/0100568 A1* | 4/2010 | Papin | | G06F 17/276 |
| | | | | 707/794 |
| 2011/0191364 A1* | 8/2011 | LeBeau | | G06F 17/30672 |
| | | | | 707/767 |
| 2011/0202876 A1* | 8/2011 | Badger | | G06F 3/0237 |
| | | | | 715/816 |
| 2013/0041890 A1* | 2/2013 | Nakayama | | G06F 17/2735 |
| | | | | 707/722 |
| 2014/0163954 A1* | 6/2014 | Joshi | | G06F 17/276 |
| | | | | 704/9 |
| 2014/0171129 A1* | 6/2014 | Benzatti | | H04W 4/025 |
| | | | | 455/457 |
| 2015/0161130 A1* | 6/2015 | Liu | | G06F 17/3053 |
| | | | | 707/723 |
| 2016/0283458 A1* | 9/2016 | Okajima | | G06F 17/246 |

FOREIGN PATENT DOCUMENTS

| | | |
|---|---|---|
| JP | 2012-155520 | 8/2012 |
| WO | WO2008/152765 | 12/2008 |

* cited by examiner

FIG. 2

| ACQUISITION TIME | INFORMATION SOURCE | KIND OF INFORMATION | INTEREST DATA | HIT NUMBER |
|---|---|---|---|---|
| 1:00 | POSITION WHERE COMMENT IS POSTED | POSITION (GPS) | New York | 0 |
| 1:00 | CONTENTS OF COMMENT | NAME OF PLACE | New York City | 0 |
| 1:00 | CONTENTS OF COMMENT | PERSON'S NAME | John | 0 |
| 2:00 | Exif INFORMATION OF PHOTO | POSITION (GPS) | Nottingham | 0 |
| 2:00 | Exif INFORMATION OF PHOTO | PHOTOGRAPHING DATE | 10/2 | 0 |
| 2:00 | LABEL OF IMAGE DATA | PERSON'S NAME | Nancy | 0 |

FIG. 3

| ACQUISITION TIME | INFORMATION SOURCE | KIND OF INFORMATION | INTEREST DATA | HIT NUMBER | SCORE |
|---|---|---|---|---|---|
| 1:00 | POSITION WHERE COMMENT IS POSTED | POSITION (GPS) | New York | 0 | $-2 = (1-3) + 0 \times 10$ |
| 1:00 | CONTENTS OF COMMENT | NAME OF PLACE | New York City | 0 | $-2 = (1-3) + 0 \times 10$ |
| ~~1:00~~ | ~~CONTENTS OF COMMENT~~ | ~~PERSON'S NAME~~ | ~~John~~ | ~~0~~ | |
| 2:00 | Exif INFORMATION OF PHOTO | POSITION (GPS) | Nottingham | 0 | $-1 = (2-3) + 0 \times 10$ |
| ~~2:00~~ | ~~Exif INFORMATION OF PHOTO~~ | ~~PHOTOGRAPHING DATE~~ | ~~10/2~~ | ~~0~~ | |
| 2:00 | LABEL OF IMAGE DATA | PERSON'S NAME | Nancy | 0 | $-1 = (2-3) + 0 \times 10$ |

FIG. 5

| ACQUISITION TIME | INFORMATION SOURCE | KIND OF INFORMATION | INTEREST DATA | HIT NUMBER | SCORE |
|---|---|---|---|---|---|
| 1:00 | POSITION WHERE COMMENT IS POSTED | POSITION (GPS) | New York | 0 | -3 = (1-4) + 0 × 10 |
| 3:00 | CONTENTS OF COMMENT | NAME OF PLACE | New York City | 1 | 9 = (3-4) + 1 × 10 |
| 2:00 | Exif INFORMATION OF PHOTO | POSITION (GPS) | Nottingham | 0 | -2 = (2-4) + 0 × 10 |
| 2:00 | LABEL OF IMAGE DATA | PERSON'S NAME | Nancy | 0 | -2 = (2-4) + 0 × 10 |

FIG. 6

| ACQUISITION TIME | PHOTO ID | INFORMATION SOURCE | KIND OF INFORMATION | INTEREST DATA | HIT NUMBER | SCORE |
|---|---|---|---|---|---|---|
| 1:00 | ID-A | Exif INFORMATION OF PHOTO | POSITION (GPS) | New York | 0 | |
| | | LABEL OF PHOTO | PERSON'S NAME | John | | |
| 2:00 | ID-B | Exif INFORMATION OF PHOTO | POSITION (GPS) | Paris | 0 | |
| | | LABEL OF PHOTO | PERSON'S NAME | Nancy | | |
| 3:00 | ID-C | Exif INFORMATION OF PHOTO | POSITION (GPS) | New York | 0 | |
| | | LABEL OF PHOTO | PERSON'S NAME | | | |

FIG. 7

| ACQUISITION TIME | PHOTO ID | INFORMATION SOURCE | KIND OF INFORMATION | INTEREST DATA | HIT NUMBER | SCORE |
|---|---|---|---|---|---|---|
| 4:00 | ID-A | Exif INFORMATION OF PHOTO | POSITION (GPS) | New York | 1 | 10 = (4-4) + 1 × 10 |
| | | LABEL OF PHOTO | PERSON'S NAME | John | | |
| 2:00 | ID-B | Exif INFORMATION OF PHOTO | POSITION (GPS) | Paris | 0 | -2 = (2-4) + 0 × 10 |
| | | LABEL OF PHOTO | PERSON'S NAME | Nancy | | |
| 3:00 | ID-C | Exif INFORMATION OF PHOTO | POSITION (GPS) | New York | 0 | -1 = (3-4) + 0 × 10 |
| | | LABEL OF PHOTO | PERSON'S NAME | | | |

FIG. 8

| ACQUISITION TIME | PHOTO ID | INFORMATION SOURCE | KIND OF INFORMATION | INTEREST DATA | HIT NUMBER | SCORE |
|---|---|---|---|---|---|---|
| 5:00 | ID-A | Exif INFORMATION OF PHOTO | POSITION (GPS) | New York | 2 | 20 = (5-5) + 2 x 10 |
| | | LABEL OF PHOTO | PERSON'S NAME | John | | |
| 2:00 | ID-B | Exif INFORMATION OF PHOTO | POSITION (GPS) | Paris | 0 | -3 = (2-5) + 0 x 10 |
| | | LABEL OF PHOTO | PERSON'S NAME | Nancy | | |
| 5:00 | ID-C | Exif INFORMATION OF PHOTO | POSITION (GPS) | New York | 1 | 10 = (5-5) + 1 x 10 |
| | | LABEL OF PHOTO | PERSON'S NAME | | | | ns
DETERMINING USER INTEREST DATA FROM DIFFERENT TYPES OF INPUTTED CONTEXT DURING EXECUTION OF AN APPLICATION

CROSS REFERENCE TO PRIOR APPLICATION

This application is a National Stage Patent Application of PCT International Patent Application No. PCT/JP2014/050826 (filed on Jan. 17, 2014) under 35 U.S.C. § 371, which claims priority to Japanese Patent Application No. 2013-078462 (filed on Apr. 4, 2013), which are all hereby incorporated by reference in their entirety.

TECHNICAL FIELD

The present disclosure relates to an information processing apparatus, a data input assistance method, and a program.

BACKGROUND ART

In applications executed in various kinds of information processing terminals, there has been diffused a data input assistance system that, in the case where a user attempts to input information, presents candidates of the information that the user attempts to input to the user. For example, as the data input assistance system to input text, there is known a system that predicts a term, a character string, or the like to be inputted next on the basis of inputted letters, terms, character strings, and the like and presents candidates thereof to a user.

For example, Patent Literature 1 discloses a technology for correcting a recognition error in a letter recognition system, which is a technology for presenting, on the basis of frequency of appearance of a term and graphical similarity of a letter, candidates of the term to correct an error of letter recognition with respect to text inputted as a target to be recognized. Patent Literature 2 discloses a technology for presenting candidates of a term that is estimated to be inputted next on the basis of terms included in a sentence preceding a sentence that is currently inputted.

CITATION LIST

Patent Literatures

| Patent Literature 1: | JP H11-328317A |
| Patent Literature 2: | JP 2012-155520A |

SUMMARY OF INVENTION

Technical Problem

However, in a conventional data input assistance system, information presented as an input candidate is selected from a range of information grasped by an application to which the information is attempted to be inputted. For example, in the technologies disclosed in Patent Literatures 1 and 2 described above, a term presented as a candidate is selected on the basis of, for example, text data that has been previously inputted in the system and a dictionary formed by comprehensively collecting text data, the dictionary being managed in the system, and an input candidate is not selected on the basis of different kinds of applications that are not associated with each other or data having different formats.

Meanwhile, it is common to install various kinds of different applications in a terminal such as a personal computer (PC) or a smartphone and complexly use those applications in the single terminal. In view of this, there has been desired a data input assistance system that also considers association between different applications and association between data having different file formats to thereby improve convenience for a user.

In view of this, the present disclosure proposes an information processing apparatus, a data input assistance method, and a program, each of which is new and improved and is capable of improving convenience for a user.

Solution to Problem

According to the present disclosure, there is provided an information processing apparatus including: an update detection unit configured to detect update of presented information presented to a user during execution of an application; an interest data extraction unit configured to extract interest data that includes at least information accompanying the presented information whose update has been detected and is information on a target in which the user is interested during execution of the application; an input context detection unit configured to detect input context indicating a processing status of input information using the application, the input information being attempted to be inputted during execution of the application; and an input information candidate presentation unit configured to perform, on the basis of the input context, control to present input information candidates that are candidates of the input information among the interest data.

According to the present disclosure, there is provided a data input assistance method including: detecting update of presented information presented to a user during execution of an application; extracting interest data that includes at least information accompanying the presented information whose update has been detected and is information on a target in which the user is interested during execution of the application; detecting input context indicating a processing status of input information using the application, the input information being attempted to be inputted during execution of the application; and performing, on the basis of the input context, control to present input information candidates that are candidates of the input information among the interest data.

According to the present disclosure, there is provided a program causing a computer to realize: a function of detecting update of presented information presented to a user during execution of an application; a function of extracting interest data that includes at least information accompanying the presented information whose update has been detected and is information on a target in which the user is interested during execution of the application; a function of detecting input context indicating a processing status of input information using the application, the input information being attempted to be inputted during execution of the application; and a function of performing, on the basis of the input context, control to present input information candidates that are candidates of the input information among the interest data.

According to the present disclosure, because interest data is extracted by using update of presented information as a trigger, the interest data is extracted in terms of whether or not a user is interested and is shared even between different applications or data having different data formats. Further, because input information candidates are presented on the basis of the interest data shared between the different applications or the interest data having the different data formats, options from which the input information candidates are selected are further increased. Therefore, it is possible to present input information candidates that are more suitable for a user.

Advantageous Effects of Invention

As described above, according to the present disclosure, it is possible to further improve convenience for a user.

BRIEF DESCRIPTION OF DRAWINGS

FIG. 2 is an explanatory view for explaining an example of interest data and various kinds of information related to the interest data that are stored in an interest data DB.

FIG. 3 is an explanatory view for explaining an example of matching processing between input context and interest data.

FIG. 5 is an explanatory view for explaining another example of matching processing between input context and interest data.

FIG. 6 is an explanatory view for explaining another example of matching processing between input context and interest data.

FIG. 7 is an explanatory view for explaining another example of matching processing between input context and interest data.

FIG. 8 is an explanatory view for explaining another example of matching processing between input context and interest data.

DESCRIPTION OF EMBODIMENTS

Figure 1:
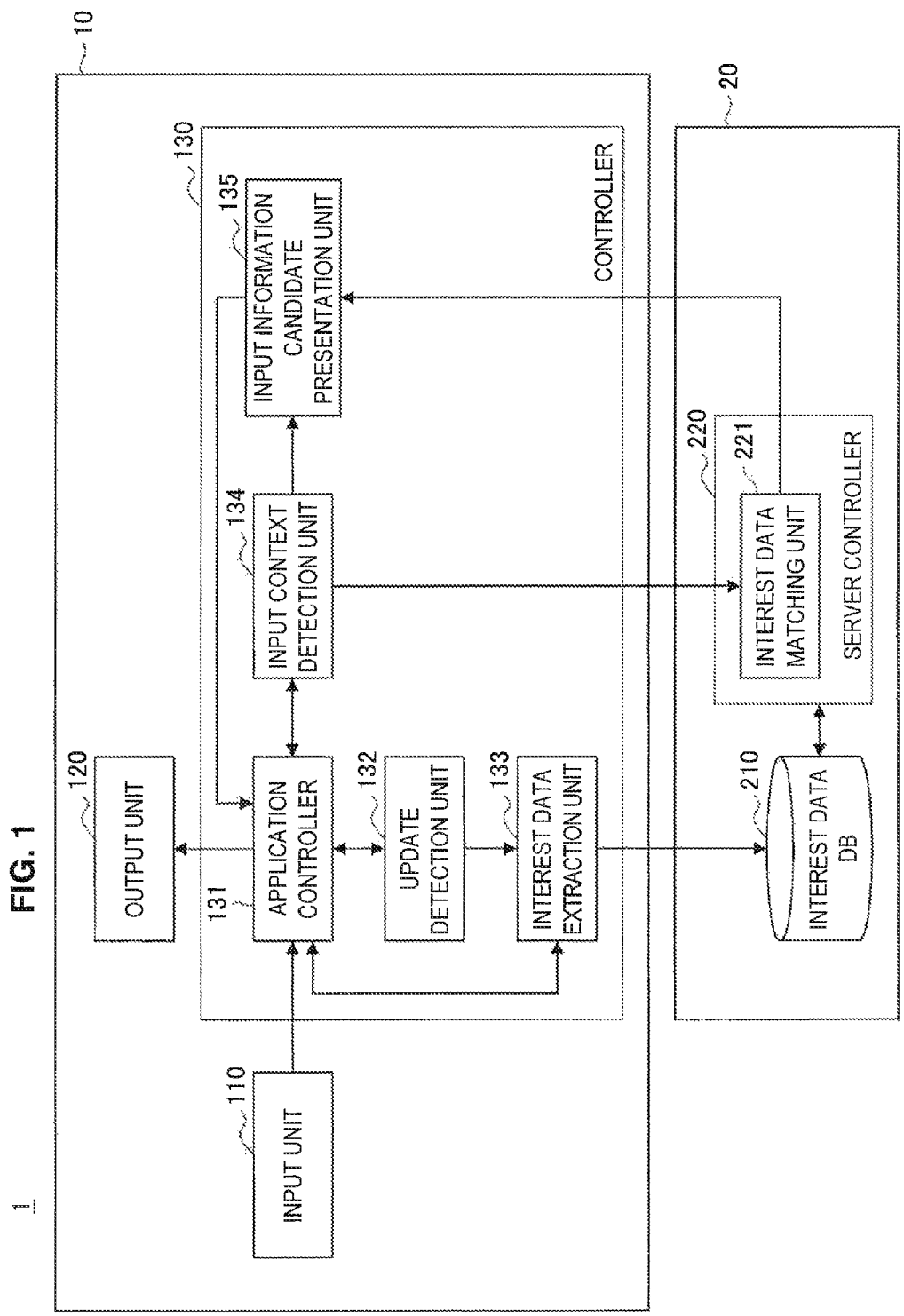
FIG. 1 is a function block diagram showing a configuration example of a data input assistance system according to one embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Configuration of data input assistance system
   1-1. Configuration of information processing apparatus
   1-2. Configuration of server
2. Specific examples of data input assistance processing
   2-1. Case where input information is text data
   2-2. Case where input information is picture data
3. Procedure of data input assistance method
4. Hardware configuration
5. Conclusion <1. Configuration of Data Input Assistance System>

In the present embodiment, update of presented information presented to a user during execution of an application is detected, and interest data including at least information accompanying the presented information whose update has been detected and indicating a target in which a user is interested during execution of the application is extracted. Further, input context indicating a processing status of input information using the application is detected, the input information being attempted to be inputted during execution of the application, and control to present input information candidates that are candidates of the input information among the interest data is performed on the basis of the input context. In the following description, the series of processing described above will be referred to as data input assistance processing.

A schematic configuration of a data input assistance system for executing the above data input assistance processing according to the present embodiment will be described with reference to FIG. 1. FIG. 1 is a function block diagram showing a configuration example of a data input assistance system according to one embodiment of the present disclosure.

With reference to FIG. 1, a data input assistance system 1 according to the present embodiment includes an information processing apparatus 10 that is a terminal operated by a user and a server 20 that manages interest data described below. Note that the information processing apparatus 10 and the server 20 are connected to communicate various kinds of information to each other in an arbitrary wired or wireless communication mode.

[1-1. Configuration of Information Processing Apparatus]

A schematic configuration of the information processing apparatus 10 will be described. The information processing apparatus 10 includes an input unit 110, an output unit 120, and a controller 130.

The input unit 110 is an input interface via which a user inputs various kinds of information, a command related to processing operation, and the like to the information processing apparatus 10. The input unit 110 includes an input device including operation means operated by a user, such as a mouse, a keyboard, and a touchscreen. In the present embodiment, a user can input, via the input unit 110, various kinds of data to be processed by an application during execution of the application. For example, in the case where email software (mailer) is being executed as the application, a user can input contents of an email to be prepared by the mailer and can select data to be attached to the prepared email via the input unit 110. Further, for example, in the case where photo browsing software (photo browser) is being executed as the application, a user can specify photo data to be displayed by the photo browser via the input unit 110. Further, for example, in the case where sound play-back software (media player) is being executed as the application, a user can specify sound data to be played back by the media player via the input unit 110. In the following description, various kinds of information, which is inputted by a user via the input unit 110 during execution of an application, will be referred to as input information.

The output unit 120 is an output interface via which various kinds of information to be processed in the information processing apparatus 10 are visually or aurally outputted for a user. The output unit 120 includes various kinds of output devices such as a display device that displays text data, photo data, and the like on a display screen and a sound output device, such as a speaker or a headphone, which outputs sound data as sound. In the present embodiment, the output unit 120 outputs, for a user, various kinds of data to be processed by an application during execution of the application. For example, in the example of the input unit 110 described above, in the case where the mailer is executed as the application, the output unit 120 displays, on the display screen, text data included in contents of an email to be prepared by the mailer and contents of data to be attached to the prepared email. Further, for example, in the case where the photo browser is executed as the application, the output unit 120 displays an image of photo data to be processed by the photo browser on the display screen. Further, for example, in the case where the media player is executed as the application, the output unit 120 outputs, as sound, contents of sound data to be played back by the media player via a speaker or the like. As described above, it can be said that information that is outputted from the output unit 120 during execution of the application is information that is visually or aurally presented to a user. In the following description, information outputted to a user by the output unit 120 will be referred to as presented information. Note that, in the following description, the present embodiment will be described by using an example where presented information is data that is visually displayed on the display screen of the output unit 120.

The controller 130 comprehensively controls the information processing apparatus 10 and performs various kinds of information processing in data input assistance processing according to the present embodiment. A function and a configuration of the controller 130 will be described below in detail.

The controller 130 includes an application controller 131, an update detection unit 132, an interest data extraction unit 133, an input context detection unit 134, and an input information candidate presentation unit 135.

The application controller 131 performs various kinds of information processing during execution of an application and comprehensively controls operation of various kinds of applications in the information processing apparatus 10. Specifically, the application controller 131 processes information that is outputted from the information processing apparatus 10 and information that is inputted to the information processing apparatus 10 during execution of the application. For example, the application controller 131 controls driving of the output unit 120 and causes the output unit 120 to output presented information presented to a user during execution of the application. Further, for example, the application controller 131 reflects, in an application that is currently executed, input information inputted from the input unit 110 during execution of the application. The application executed by the application controller 131 may be one of various publicly known applications such as a mailer, a photo browser, a media player, a web browser, and a microblog (such as Twitter (registered trademark)).

The update detection unit 132 detects update of presented information presented to a user during execution of an application. Specifically, the update detection unit 132 monitors operation of the application controller 131 and detects whether or not the presented information has been updated. For example, in the case where an application that is currently executed is a mailer, the update detection unit 132 detects that the presented information has been updated when display of a character string in a text input area of an email displayed on the display screen of the output unit 120 is changed by the application controller 131. Further, for example, in the case where an application that is currently executed is a photo browser, the update detection unit 132 detects that the presented information has been updated when a photo displayed on the display screen of the output unit 120 is changed by the application controller 131. As described above, based on, for example, a change in display on the display screen of the output unit 120, the update detection unit 132 detects that the presented information has been updated. When detecting update of the presented information, the update detection unit 132 transmits information indicating such detection (information indicating that the presented information has been updated) to the interest data extraction unit 133.

When receiving, from the update detection unit 132, the information indicating that the presented information has been updated, the interest data extraction unit 133 extracts, from various kinds of information processed by the application controller 131 during execution of the application, interest data that includes at least information accompanying the presented information whose update has been detected and is information on a target in which the user is interested during execution of the application. Further, the interest data may include the presented information itself. Herein, as described above, the presented information is information presented to a user during execution of an application. Therefore, it can be said that the presented information is information browsed by the user during execution of the application and is information indicating a target in which the user is interested. Therefore, by extracting the presented information whose update has been detected and the information accompanying the presented information, the interest data extraction unit 133 can extract the interest data that is the information on the target in which the user is interested. As described above, by inquiring the application controller 131, the interest data extraction unit 133 according to the present embodiment can extract the presented information and the information accompanying the presented information as the interest data.

Herein, the information accompanying the presented information may include metadata associated with the presented information. For example, in the case where the application is a photo browser, presented information that is actually and visually presented by the photo browser to a user is image data included in the photo data. However, the photo data includes, as file information, information such as a title (label). The photo data also includes information such as a photographing date and a photographing location thereof as, for example, exchangeable image file format (Exif) information. The file information, the Exif information, and other information on the photo data are not presented information itself but is metadata associated with the presented information, and therefore it can be said that the above information is information indicating a target in which the user is interested. The interest data extraction unit 133 according to the present embodiment can also extract, as the interest data, such metadata associated with the presented information.

Further, the information accompanying the presented information may include a processing status of the presented information using the application, i.e., context information of the presented information. Specifically, the context information of the presented information is information on how the presented information is processed by the application. For example, in the case where the presented information is a character string in the text input area of the mailer that is currently executed, the context information of the presented information may be information indicating that "the character string is displayed as contents of an email in the mailer". Further, in the case where the presented information is a character string in an article of a blog (Weblog) that is currently executed in the Web browser, the context information of the presented information may be information indicating that "the character string is a character string displayed as contents in the article in the blog". The context information of the presented information exemplified above is not the presented information itself but is dynamic metadata showing under what circumstances the presented information is presented, and therefore it can be said that the context information is information indicating a target in which the user is interested. The interest data extraction unit 133 according to the present embodiment can also extract the context information of the above presented information as the interest data.

Further, the information accompanying the presented information may include original data to which the presented information belongs. For example, as described above, in the case where the presented information is the image data of the photo data, it can be said that the photo data itself that is original data to which the presented information belongs is also information accompanying the presented information. Therefore, the interest data extraction unit 133 can extract, as the interest data, the photo data itself that is the original data to which the presented information belongs.

Note that the interest data according to the present embodiment is not limited to the information exemplified above. The interest data extraction unit 133 may detect various kinds of information as the interest data as long as the information is information on a target in which the user is interested during execution of the application.

The interest data extraction unit 133 transmits the extracted interest data to an interest data database (DB) 210 of the server 20 described below. Further, in the case where the interest data is extracted, the interest data extraction unit 133 receives various kinds of information related to the interest data from the application controller 131 and can transmit those various kinds of information together with the interest data to the interest data DB 210. The various kinds of information related to the interest data may be, for example, information such as a time at which the interest data is extracted (extraction time), a time at which the information is used as the input information (use time), an information source, the kind of information, and the number of times (hit number) of using the information as the input information. Note that, in the following description, the extraction time and the use time will be also collectively referred to as an acquisition time. A specific example of the interest data and the various kinds of information related to the interest data will be described below with reference to FIG. 2 in the description of a function of the interest data DB 210.

The input context detection unit 134 detects input context indicating a processing status of input information using an application, the input information being attempted to be inputted during execution of the application. Herein, the input context is information indicating what information is attempted to be inputted as the input information. For example, the input context includes information such as a data format of the input information, the kind of input information, and the kind of application to which the input information is attempted to be inputted. The data format of the input information indicates a data format such as text data, photo data, and sound data. Further, the kind of input information indicates meaning of the input information as information, i.e., for example, indicates whether the character string represents a name of a place, a person's name, or a common noun in the case where the input information is the character string. As described above, the input context means, so to speak, a background (context in the broad sense) in which the input information is attempted to be inputted and can be detected on the basis of information on an application that is currently executed (e.g., data format that can be inputted in the application, the kind of information to be inputted in the application) and the input information. Therefore, the input context detection unit 134 according to the present embodiment can detect context information of such input information by receiving necessary information from the application controller 131.

A function of the input context detection unit 134 will be specifically described by using examples. For example, it is assumed that a letter "N" is inputted to a text input area for text of an email by a user via the input unit 110 while a mailer is being executed as an application. The application controller 131 to which this information has been inputted displays the letter "N" on the display screen of the output unit 120 and transmits, to the input context detection unit 134, information indicating that the above information has been inputted via the input unit 110. Herein, the application controller 131 recognizes various kinds of information on the inputted information, such as information indicating that the application that is currently executed is a mailer, information indicating that the character string (text data) is attempted to be inputted, and information indicating that the letter "N" has been actually inputted. Therefore, by inquiring the application controller 131, the input context detection unit 134 can detect, as the input context, information such as information indicating that the input information is a character string starting with "N" (character string starting with "N" is attempted to be inputted), information indicating that a data format of the input information is text data, and information indicating that the application to which the input information is attempted to be inputted is a mailer.

The function of the input context detection unit 134 will be further described by using another example. For example, it is assumed that an attached data input area is selected by a user via the input unit 110 while a mailer is being executed as an application, and, when an attached data is selected, information indicating that a folder storing photo data has been specified is inputted. The application controller 131 to which this information has been inputted displays photo data that is candidates of the attached data on the display screen of the output unit 120 and transmits, to the input context detection unit 134, information indicating that the above information has been inputted via the input unit 110. Herein, the application controller 131 recognizes various kinds of information on the inputted information, such as information indicating that the application that is currently executed is a mailer, information indicating that the photo data is attempted to be inputted, and information indicating a location (path) of the folder storing the photo data that is the candidates of the attached data. Therefore, by inquiring the application controller 131, the input context detection unit 134 can detect, as the input context, information such as information indicating that the input information (data format of input information) is photo data, information indicating the location (path) of the folder storing the photo data, and information indicating that the application to which the input information is attempted to be inputted is a mailer Note that the input context according to the present embodiment is not limited to the information exemplified above. The input context detection unit 134 may detect various kinds of information as the input context as long as the information relates to the input information.

The input context detection unit 134 transmits the detected input context to the input information candidate presentation unit 135 and the server 20. The input context detection unit 134 can transmit, to the input information candidate presentation unit 135 and the server 20, not only the detected input context but also information on a time at which the input context is detected.

In the server 20, processing for matching the detected input context with the interest data stored in the interest data DB 210 is performed. The matching processing is processing for selecting interest data matching with the input context from the interest data DB 210. The matching processing will be described in detail below in the description of a configuration of the server 20. The server 20 transmits results of the matching processing to the input information candidate presentation unit 135.

The input information candidate presentation unit 135 performs control to present input information candidates that are candidates of the input information among the interest data extracted by the interest data extraction unit 133 on the basis of the input context detected by the input context detection unit 134. Specifically, the input information candidate presentation unit 135 selects input information candidates to be presented to a user on the basis of the input context detected by the input context detection unit 134 and performs control to display the input information candidates on the display screen of the output unit 120 via the application controller 131. Herein, the input information candidate presentation unit 135 may receive results of matching processing between input context and interest data, the matching processing being performed by the server 20, and perform control to present input information candidates among the interest data on the basis of the matching results. Further, in the case where the input information candidates are presented, the input information candidate presentation unit 135 may prioritize input information candidates and present the input information candidates in accordance with the priority.

[1-2. Configuration of Server]

A schematic configuration of the server 20 will be described. The server 20 includes the interest data DB 210 and a server controller 220.

The interest data DB 210 is an example of a storage medium for storing various kinds of information to be processed and results processed by the server 20. In the present embodiment, the interest data DB 210 stores interest data extracted by the interest data extraction unit 133 of the information processing apparatus 10. Further, the interest data DB 210 stores interest data in association with various kinds of information related to the interest data and can therefore manage history of the interest data.

Herein, an example of the interest data and the various kinds of information related to the interest data that are stored in the interest data DB 210 will be described with reference to FIG. 2. FIG. 2 is an explanatory view for explaining an example of the interest data and the various kinds of information related to the interest data that are stored in the interest data DB 210.

With reference to FIG. 2, the interest data is stored in the interest data DB 210 in association with the various kinds of information related to the interest data, such as an acquisition time, an information source, the kind of information, and the hit number of the interest data.

The acquisition time means a time (extraction time) at which the interest data has been extracted by the interest data extraction unit 133 or a time (use time) at which the interest data has been used as the input information. Further, the information source means the kind of original data or metadata from which the interest data is extracted. Further, the kind of information means the kind (property) of the interest data. Further, the hit number means the number of times of using the interest data as the input information.

For example, it is assumed that a user posts a comment whose contents include a character string "New York City" and a character string "John" with the use of a microblog at 1:00 and then browses photo data with the use of a photo browser at 2:00. FIG. 2 shows an example of the interest data extracted by this series of operation.

In the operation of the microblog performed at 1:00, the character string "New York City" and the character string "John", which are presented information itself, are extracted as the interest data by the interest data extraction unit 133 and are stored in the interest data DB 210. Further, the interest data "New York City" is stored in association with, for example, the acquisition time "1:00", the information source "contents of comment", and the kind of information "name of a place" as the information related to the interest data. Similarly, the interest data "John" is stored in association with, for example, the acquisition time "1:00", the information source "contents of comment", and the kind of information "person's name" as the information related to the interest data. Herein, the information such as "person's name" and "name of a place", which are the kinds of information, may be information acquired in such a way that, based on the extracted interest data, the interest data DB 210 refers to an additional DB in which terms generally used as, for example, a person's name and a name of a place are registered.

In the operation of the microblog, a character string "New York", which is information accompanying the presented information, is extracted as the interest data instead of the presented information itself. The interest data "New York" is not the presented information itself and is information related to a position where the comment has been posted, which has been detected by a GPS or the like. Therefore, as shown in FIG. 2, the interest data "New York" is stored in the interest data DB 210 in association with, for example, the acquisition time "1:00", the information source "position where the comment has been posted", and the kind of information "position (GPS)" as the information related to the interest data.

In the operation of the photo browser performed at 2:00, information accompanying the presented information is extracted as the interest data instead of an image itself of a photo that is the presented information. For example, a location "Nottingham" where the photo has been taken and a date "10/2" at which the photo has been taken are extracted as the interest data from Exif information of the photo data that is the presented information. Further, a character string "Nancy" included in a label of the photo data is extracted as the interest data from file information of the photo data.

The above interest data "Nottingham", "10/2", and "Nancy" are also stored in the interest data DB 210 in association with the various kinds of information related to the interest data. For example, as shown in FIG. 2, the interest data "Nottingham" is stored in the interest data DB 210 in association with, for example, the acquisition time "2:00", the information source "Exif information of photo data", and the kind of information "position (GPS)" as the information related to the interest data. Further, the interest data "10/2" is stored in the interest data DB 210 in association with, for example, the acquisition time "2:00", the information source "Exif information of photo data", and the kind of information "date" as the information related to the interest data. Further, the interest data "Nancy" is stored in the interest data DB 210 in association with, for example, the acquisition time "2:00", the information source "label of photo data", and the kind of information "person's name" as the information related to the interest data.

As described above with reference to FIG. 2, the interest data DB 210 according to the present embodiment stores the interest data in association with the various kinds of information related to the interest data. Further, every time when new information related to the interest data is inputted, the interest data DB 210 can store the information while updating the information. That is, the interest data DB 210 can manage history of the interest data.

Note that, in an item "Hit number", the number of times of using the interest data as the input information is inputted, and, in the example of FIG. 2, the hit number is set to "0" in all interest data for ease of explanation. Further, in the example of FIG. 2, the interest data "New York", "John", "New York City", "Nottingham", "10/2", and "Nancy" are extracted as a character string or a number string.

Referring back to FIG. 1, the configuration of the server 20 will be described.

The server controller 220 comprehensively controls the server 20 and performs various kinds of information processing in the data input assistance processing according to the present embodiment. In the present embodiment, the server controller 220 performs matching processing between input context and interest data by referring to the interest data DB 210.

The configuration of the server controller 220 will be described in more detail. The server controller 220 includes an interest data matching unit 221. The interest data matching unit 221 performs the matching processing for selecting, from the interest data DB 210, interest data matching with the input context detected by the input context detection unit 134.

Specifically, when receiving the input context of the input information from the input context detection unit 134, the interest data matching unit 221 selects interest data corresponding to the input context from the interest data stored in the interest data DB 210. In the following description, the interest data matching with the input context, which is selected in the matching processing, will be also referred to as a matching candidate.

Herein, a function of the interest data matching unit 221 will be described in more detail by using an example where the input context detection unit 134 detects that "the character string starting with "N" is attempted to be inputted" as the input context. For example, when receiving input context indicating that "the character string starting with "N" is attempted to be inputted", the interest data matching unit 221 first selects interest data whose data format is text data (character string) from the interest data stored in the interest data DB 210. Then, the interest data matching unit 221 further selects, from the above interest data, interest data whose first letter is "N" as the interest data matching with the input context. For example, in the example of FIG. 2, the interest data matching unit 221 selects "New York", "New York City", "Nottingham", and "Nancy" as the interest data matching with the input context.

As described above, in the matching processing according to the present embodiment, interest data having a data format matching with the data format included in the input context may be selected. Further, for example, in the case where information on the kind of input information is included in the input context, interest data matching with the kind of the information may be selected.

As described above, in the matching processing according to the present embodiment, interest data matching with the input context may be selected by comparing various kinds of information included in the input context with the interest data and the information related to the interest data.

Further, in the case where interest data matching with the input context is selected, the interest data matching unit 221 can determine, on the basis of a predetermined method, priority used for presenting the interest data as input information candidates. Note that the function of the interest data matching unit 221 will be described again in detail in <2. Specific examples of data input assistance processing> described below.

The interest data matching unit 221 transmits results of the matching processing (matching results) to the input information candidate presentation unit 135 of the information processing apparatus 10. Based on the results of the matching processing, the input information candidate presentation unit 135 can perform control to select interest data matching with input context as input information candidates and present the interest data to a user.

In the above description, examples of the functions of the processing apparatus 10 and the server 20 according to the present embodiment, and, in particular, examples of the functions of the controller 130 and the server controller 220 have been described in detail with reference to FIG. 1. Note that each of the above structural elements of the information processing apparatus 10 and the server 20 may be realized using general-purpose members and circuits, but may also be realized in hardware specialized in the function of each structural element. Further, all functions of the structural elements of the controller 130 and the server controller 220 may be performed by a central processing unit (CPU) or the like. Consequently, it is possible to appropriately modify the configuration to be used according to the technological level at the time of carrying out the present embodiment.

Further, although a case where the data input assistance system 1 includes the information processing apparatus 10 and the server 20 has been described in the example of FIG. 1, the present embodiment is not limited to this example. Functions of respective function blocks in FIG. 1 may be performed by a single apparatus or may be distributed into and performed by two or more apparatuses. For example, the functions of the interest data 210 and the interest data matching unit 221 may be performed by the information processing apparatus 10. Alternatively, for example, the information processing apparatus 10 may include only the functions of the input unit 110, the output unit 120, and the application controller 131, i.e., may be an interface apparatus only for executing an application, and all other functions may be performed by the server 20. Note that the server 20 may be, for example, a server provided in a cloud, and the information processing apparatus 10 and the server 20 may be communicably connected with each other via a communication network (network).

Note that a hardware configuration of the information processing apparatus 10 and the server 20 will be described in detail in <4. Hardware configuration>.

As described above, in the data input assistance system 1 according to the present embodiment, update of presented information presented to a user during execution of an application is detected by the update detection unit 132, and interest data that includes at least information accompanying the presented information whose update has been detected and is information on a target in which a user is interested during execution of the application is extracted by the interest data extraction unit 133. As described above, in the present embodiment, because the interest data is extracted by using update of presented information as a trigger, the interest data is extracted in terms of whether or not a user is interested and is shared even between different applications or data having different data formats.

Further, in the data input assistance system 1 according to the present embodiment, input context indicating a processing status of input information using an application is detected by the input context detection unit 134, the input information being attempted to be inputted during execution of the application, and control to present input information candidates that are candidates of the input information among the interest data is performed on the basis of the input text by the input information candidate presentation unit. As described above, because input information candidates are presented among the interest data shared between different applications, for example, interest data extracted in a certain application can be presented as an input information candidate in another application. Further in the present embodiment, not only presented information but also information accompanying the presented information are extracted as interest data, and therefore more data are accumulated as the interest data. Therefore, options from which the input information candidates are selected are further increased. Therefore, a data input assistance system having higher convenience for a user is achieved.

Further, in the data input assistance system 1 according to the present embodiment, input context detected by the input context detection unit 134 may include various kinds of information on input information such as a data format of the input information. Therefore, in matching processing between input context and interest data, it is possible to narrow down matching candidates under more conditions, and therefore interest data that is more desirable as the input information is presented to a user as input information candidates. This improves convenience for a user.

<2. Specific Examples of Data Input Assistance Processing>

The data input assistance processing according to the present embodiment will be specifically described in detail by using examples. In the following description, a case where input information is text data and a case where input information is photo data will be described.

[2-1. Case where Input Information is Text Data]

Figure 4:
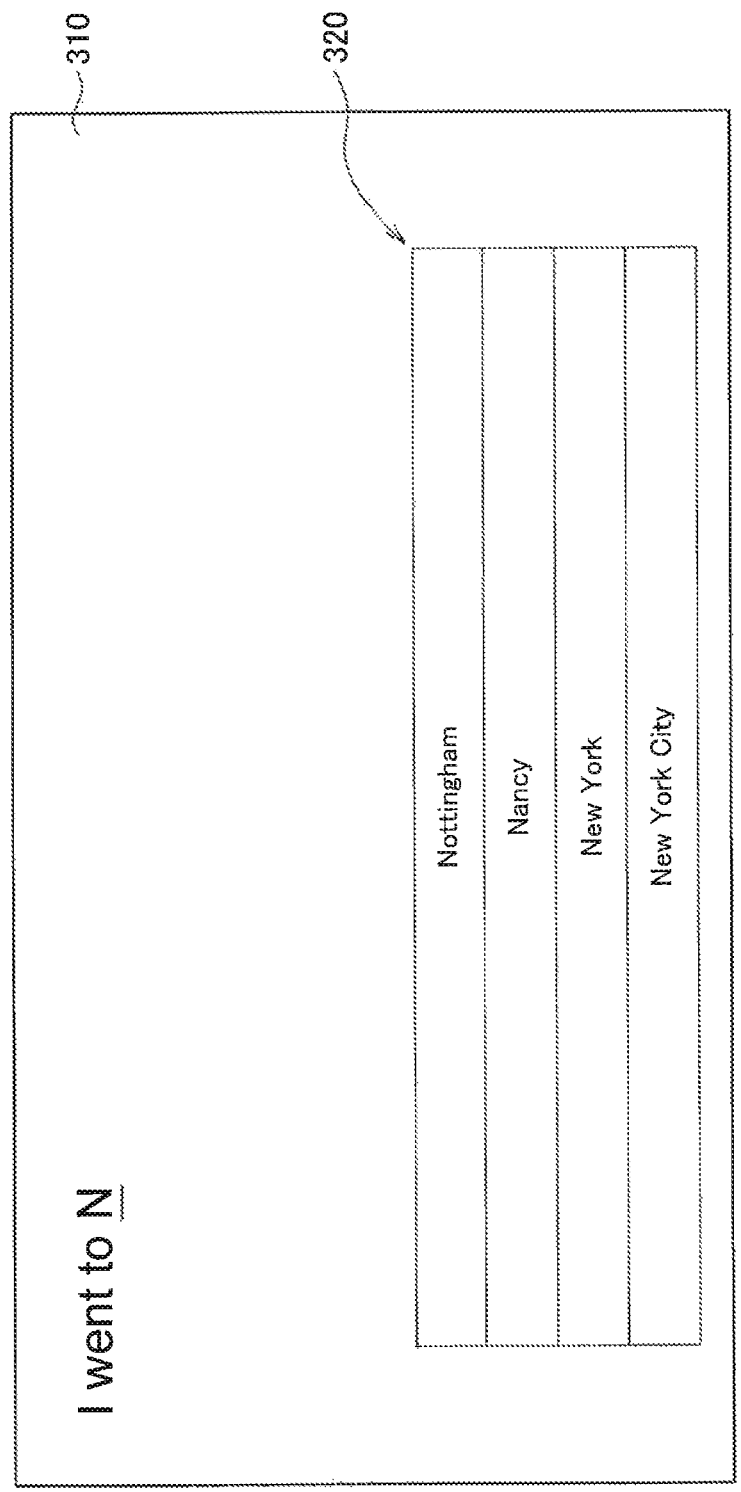
FIG. 4 is an explanatory view for explaining an example of a display screen displayed in the case where input information candidates are presented to a user.

Data input assistance processing performed in the case where input information is text data will be described with reference to FIG. 3, FIG. 4, and FIG. 5. FIG. 3 and FIG. 5 are explanatory views for explaining examples of matching processing between input context and interest data. FIG. 4 is an explanatory view for explaining an example of a display screen displayed in the case where input information candidates are presented to a user.

FIG. 3 shows interest data that is the same as the interest data that has been described with reference to of FIG. 2 as an example of the interest data stored in the interest data DB 210. That is, the interest data "New York", "New York City", and "John" are extracted when the comment is posted with the use of the microblog at 1:00, and the interest data "Nottingham", "10/2", and "Nancy" are extracted when the photo is browsed with the use of the photo browser at 2:00, and the interest data is stored in the interest data DB 210 in association with various kinds of information on the interest data, as shown in FIG. 3. Note that, regarding the above interest data, the number of times of using the interest data as the input information (hit number) is set to "0" for ease of explanation.

Herein, for example, it is assumed that a user starts inputting a sentence to a text input area while a mailer is being executed. Further, for example, it is assumed that the input context detection unit 134 detects that "a character string starting with "N" is attempted to be inputted" as input context at 3:00. The interest data matching unit 221 that has received the input context performs matching processing between the interest data stored in the interest data DB 210 and the input context. In the matching processing, interest data whose data format is text data (character string) is selected as interest data matching with the input context from the interest data stored in the interest data DB 210. Further, interest data whose first letter is "N" is selected, from the interest data, as matching candidates that are interest data matching with the input context. In the example of FIG. 3, "John" and "10/2", which are interest data that does not match with those conditions, are removed from the matching candidates. In FIG. 3, removal of the conditions from the matching candidates is expressed by drawing strikethroughs.

Further, the interest data matching unit 221 can prioritize matching candidates as input information candidates in the matching processing. This prioritization is performed by applying, to each matching candidate, a score obtained by calculated on the basis of, for example, a predetermined calculation expression. In the present embodiment, the calculation expression is set so that the score becomes higher as an elapsed time from extraction of the interest data or from use of the interest data as the input information is shorter and the score becomes higher as the number of times of using the interest data as the input information (hit number) is increased. Such a calculation expression is expressed by, for example, the following numerical expression (1).

Score=(Interest data extraction time or Interest data use time−Input context detection time)+(Hit number of interest data×10)  (1)

By using the numerical expression (1), interest data corresponding to presented information that has been presented more recently to a user has a higher score and interest data that has been used more recently by the user has a higher score. Therefore, the above interest data has higher priority as the input information candidates. This makes it possible that matching candidates that the user is more likely to use as the input information have higher priority.

In an item "Score" of FIG. 3, scores calculated by the numerical expression (1) are shown. With reference to FIG. 3, the interest data "Nottingham" and "Nancy" has relatively high scores, and the interest data "New York" and "New York City" has relatively low scores. Note that, in FIG. 3, scores of the interest data "John" and "10/2" removed from the matching candidates are not shown. A score of interest data removed from matching candidates may or may not be calculated.

The interest data matching unit 221 transmits results (matching results) of the matching processing to the input information candidate presentation unit 135. Herein, the matching results include information on the selected interest data (i.e., matching candidates) and the scores thereof. In the example of FIG. 3, the interest data matching unit 221 transmits, as the matching results, the interest data "New York", "New York City", "Nottingham", and "Nancy" and the scores of the interest data to the input information candidate presentation unit 135.

The input information candidate presentation unit 135 that has received the matching results displays the input information candidates on the display screen of the output unit 120 on the basis of the contents thereof. FIG. 4 shows an example of the display screen on which the input information candidates are displayed.

FIG. 4 shows a state of a display screen 310 displayed in the case where a character string starting with a letter of N is attempted to be inputted by a user to a text input area of text of a mailer. Specifically, "I went to N", which is text data inputted by the user, is displayed on the display screen 310. The underline below "N" indicates that an input cursor for inputting data exists on "N" and a character string starting with "N" is attempted to be inputted. Further, "Nottingham", "Nancy", "New York", and "New York City" are shown in the form of a list as input information candidates 320 in a lower part of the display screen 310. Further, the input information candidates 320 are displayed in order of scores calculated by the interest data matching unit 221 from a candidate having the highest score.

By selecting a character string that the user wants to input from the displayed input information candidates 320, the user can input the character string. Further, at that time, because the input information candidates 320 are displayed in order of scores from the candidate having the highest score, candidates that the user is likely to use as input information are displayed in a location that can be easily noticed by the user. This improves convenience for the user.

Herein, it is assumed that "New York City" is selected as the input information by the user on the display screen 310 of FIG. 4. Then, a character string "I went to New York City" is displayed on the display screen 310, and therefore the character string "New York City" is extracted as the interest data again by the interest data extraction unit 133. Further, in the case where the character string "New York City" is extracted as the interest data again, the interest data extraction unit 133 can acquire the latest information as information related to the interest data from the application controller 131. In the above example, an extraction time or a use time and the hit number of the interest data "New York City" are updated from those shown in FIG. 3. FIG. 5 shows an example of the interest data stored in the interest data DB 210 after the user selects "New York City" from the input information candidates. When comparing FIG. 3 with FIG. 5, the acquisition time of the interest data "New York City" is updated to "3:00" and the hit number thereof is updated to "1" in FIG. 5.

Herein, it is assumed that it is detected that "a character string starting with a letter of N is attempted to be inputted" again to the text input area of the text of the mailer as the input context at 4:00. The matching processing between the interest data stored in the interest data DB 210 and the input context is performed again by the interest data matching unit 221, and the interest data stored in the interest data DB 210 is updated to, for example, a state shown in FIG. 5. Therefore, calculation results of scores are also different from those in the example of FIG. 3, and, in the example of FIG. 5, a score of the interest data "New York City" is higher than scores of the other interest data. This is because the numerical expression (1) is set so that a score becomes higher as an acquisition time of interest data is more recent. Therefore, in the case where input information candidates are displayed again on the display screen on the basis of matching results, "New York City" is displayed in a location that can be the most easily noticed by the user among the input information candidates. This improves convenience for the user to select input information.

[2-2. Case where Input Information is Picture Data]

Figure 9:
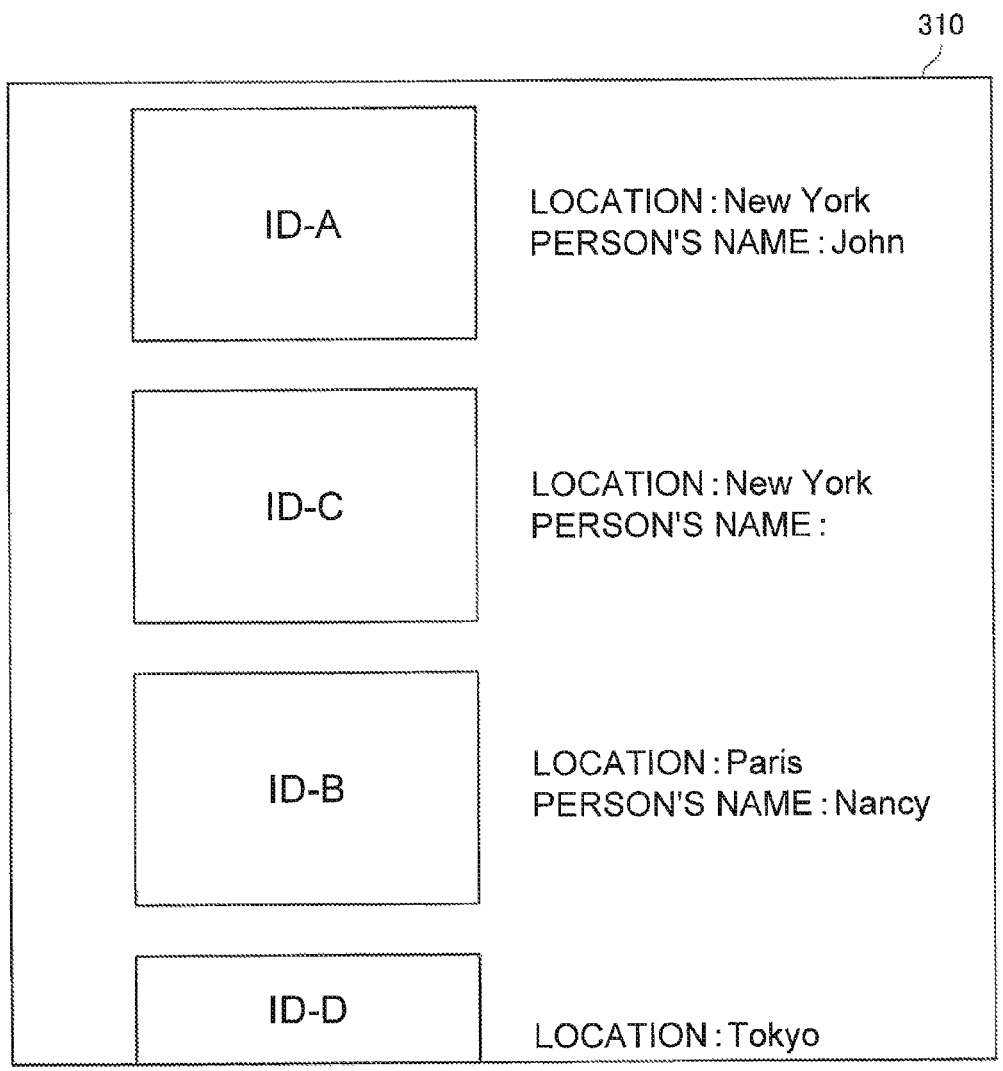
FIG. 9 is an explanatory view for explaining another example of a display screen displayed in the case where input information candidates are presented to a user.

Data input assistance processing performed in the case where input information is text data will be described with reference to FIG. 6, FIG. 7, FIG. 8, and FIG. 9. FIG. 6, FIG. 7, and FIG. 8 are explanatory views for explaining examples of matching processing between input context and interest data. FIG. 9 is an explanatory view for explaining an example of a display screen displayed in the case where input information candidates are presented to a user. Note that, in the examples of FIG. 6, FIG. 7, and FIG. 8, input assistance processing performed in the case where it is detected that "data format of input information is photo data" as the input context will be described, and therefore the photo data is shown as the interest data. Further, interest data extracted as information accompanying the presented information of the photo data is shown in association with each piece of the photo data.

FIG. 6 shows, as an example of the interest data, interest data stored in the interest data DB 210 after a photo is browsed with the use of a photo browser. Herein, it is assumed that a photo having a photo ID of "ID-A" has been browsed at 1:00, a photo having a photo ID of "ID-B" has been browsed at 2:00, and a photo having a photo ID of "ID-C" has been browsed at 3:00 by the photo browser. Then, the interest data extraction unit 133 simultaneously extracts image data included in the photos that are presented information and information accompanying the presented information. For example, in the case of the photo having the photo ID of "ID-A", "New York" which is a photographing location of the photo is extracted as the interest data from Exif information of the photo and "John" which is a person's name related to the photo is extracted as the interest data from a label of the photo. Similarly, in the case of the photo having the photo ID of "ID-B", "Paris" which is a photographing location of the photo is extracted as the interest data from Exif information of the photo and "Nancy" which is a person's name related to the photo is extracted as the interest data from a label of the photo. Furthermore, similarly, in the case of the photo having the photo ID of "ID-C", "New York" which is a photographing location of the photo is extracted as the interest data from Exif information of the photo. Further, the above interest data is stored in the interest data DB 210 in association with an acquisition time, an information source, the kind of information, and hit number which are information related to the interest data, which is similar to the example of FIG. 2. Note that, in the example of FIG. 6, the photo data is shown as the interest data as described above, and the interest data extracted as the information accompanying the presented information of the above photo data is shown in association with each piece of the photo data, and therefore the interest data "New York", "John", "Paris", and "Nancy" is shown in association with the photo IDs of the photo data. Further, regarding the interest data, the hit number at present is set to "0" for ease of explanation.

Herein, it is assumed that the user posts a comment including the character string "John" with the use of the microblog at 4:00. Then, the acquisition time of the interest data "John" is updated to "4:00" and the hit number is updated to "1". Further, as shown in FIG. 7, the acquisition time and the hit number of the photo data having the photo ID of "ID-A", which is the photo data associated with the interest data. "John", are also updated to "4:00" and "1", respectively. Further, FIG. 7 also shows results of score calculation in the interest data matching unit 221, which is obtained in the case where it is detected that "a data format of the input information is photo data" as the input context at this stage. When referring to the item of "Score", a score of the photo data having the photo ID of "ID-A" which is the hit number of "1" is higher than scores of other photo data.

Herein, further, it is assumed that the user inputs the character string "New York" to the text input area with the use of a mailer at 5:00. Then, the acquisition time of the interest data "New York" is updated to "5:00" and the hit number is updated to "1". Further, as shown in FIG. 8, an acquisition time of each of the photos having the photo IDs of "ID-A" and "ID-C" which are photo data associated with the interest data "New York" is updated to 5:00. Further, the hit number of the photo data having the photo ID of "ID-A" is updated to "2" and the hit number of the photo data having the photo ID of "ID-C" is updated to "1". In the present embodiment, as shown in FIG. 6, FIG. 7, and FIG. 8, in the case where another interest data is further associated with the interest data (photo data in FIG. 6, FIG. 7, and FIG. 8), the information related to the interest data such as the acquisition time and the hit number may be shared by the above interest data.

Herein, it is assumed that the user attempts to attach photo data to an email as attached data immediately after the state shown in FIG. 8. Then, it is assumed that the input context detection unit 134 detects that "a data format of the input information is photo data" as the input context. The interest data matching unit 221 that has received the input context performs matching processing between the interest data stored in the interest data DB 210 and the input context. In the matching processing, interest data whose data format is photo data is selected from the interest data stored in the interest data DB 210 as interest data matching with the input context. In the example of FIG. 8, the interest data matching unit 221 selects the photo data of the photo IDs of "ID-A", "ID-B", and "ID-C" as the matching candidates and calculates scores of the photo data on the basis of the numerical expression (1). Then, the interest data matching unit 221 transmits, as matching results, the photo data of the photo IDs of "ID-A", "ID-B", and "ID-C" and the scores of the photo data to the input information candidate presentation unit 135.

The input information candidate presentation unit 135 that has received the matching results displays input information candidates on the display screen of the output unit 120 on the basis of contents thereof. FIG. 9 is an example of the display screen 310 on which the input information candidates are displayed.

FIG. 9 shows a state of the display screen 310 displayed in the case where photo data to be attached to an email is selected by a user. Specifically, thumbnails of the photo data having the photo IDs of "ID-A", "ID-B", and "ID-C" are displayed in the form of a list on the display screen 310 as the input information candidates. Further, those input information candidates are displayed in order of scores calculated by the interest data matching unit 221 from a candidate having the highest score. In the example of FIG. 9, the input information candidates having the photo IDs of "ID-A", "ID-C", and "ID-B" are displayed in this order on the basis of the calculation results of the scores of FIG. 8. Note that photo data that is not stored in the interest data DB 210 but is attachable may be also displayed on the display screen 310 such as the photo data having the photo ID of "ID-D". Note that, in the case where the photo data that is not stored in the interest data DB 210 but is attachable is also displayed, priority of input of the photo data may be lower than that of the input information candidates selected from the interest data. This is because the user is more interested in the input information candidates selected from the interest data and is likely to select the input information candidates as the input information.

By selecting photo data that the user wants to input from the input information candidates displayed on the display screen 310, the user can attach the photo data to an email. Further, at that time, because the input information candidates are displayed in order of scores from a candidate having the highest score, candidates that the user is likely to use as input information are displayed in a location that can be easily noticed by the user. This improves convenience for the user.

In the above description, the data input assistance processing according to the present embodiment has been described in detail by using the specific examples with reference to FIG. 3, FIG. 4, FIG. 5, FIG. 6, FIG. 7, FIG. 8, and FIG. 9. Note that the data input assistance processing according to the present embodiment is not limited to the above examples, and other various kinds of information may be used as the interest data, the input context, and the input information. For example, in the case where the input context indicates that "the kind of input information is a person's name", the interest data matching unit 221 may select, as matching candidates, interest data in which "the kind of information" is "person's name" from the interest data stored in the interest data DB 210.

As described above, in the present embodiment, interest data having different data formats are extracted between different applications, and input information candidates are selected from the interest data. Therefore, even the different applications achieve data input assistance processing associated therebetween. For example, there is assumed a case where an email is prepared and transmitted by a mailer immediately after a comment is posted by a microblog. In the case where posting of a comment and preparation of an email are continuously performed as described above, it is likely that contents of the comment and contents of the email are related to each other. In the data input assistance processing according to the present embodiment, in the case where an email is attempted to be prepared and photo data is attempted to be attached to the email immediately after a comment having contents to which a character string meaning a person's name, a name of a place, and/or the like has been inputted is posted, photos related to the person's name, the name of the place, and/or the like inputted as the contents of the comment are displayed as candidates of the photo data to be attached so as to have higher priority. As described above, in the present embodiment, interest data is transversely extracted between different applications and input information candidates are selected, and therefore data input assistance processing having high convenience for a user is achieved.

<3. Procedure of Data Input Assistance Method>

Figure 10:
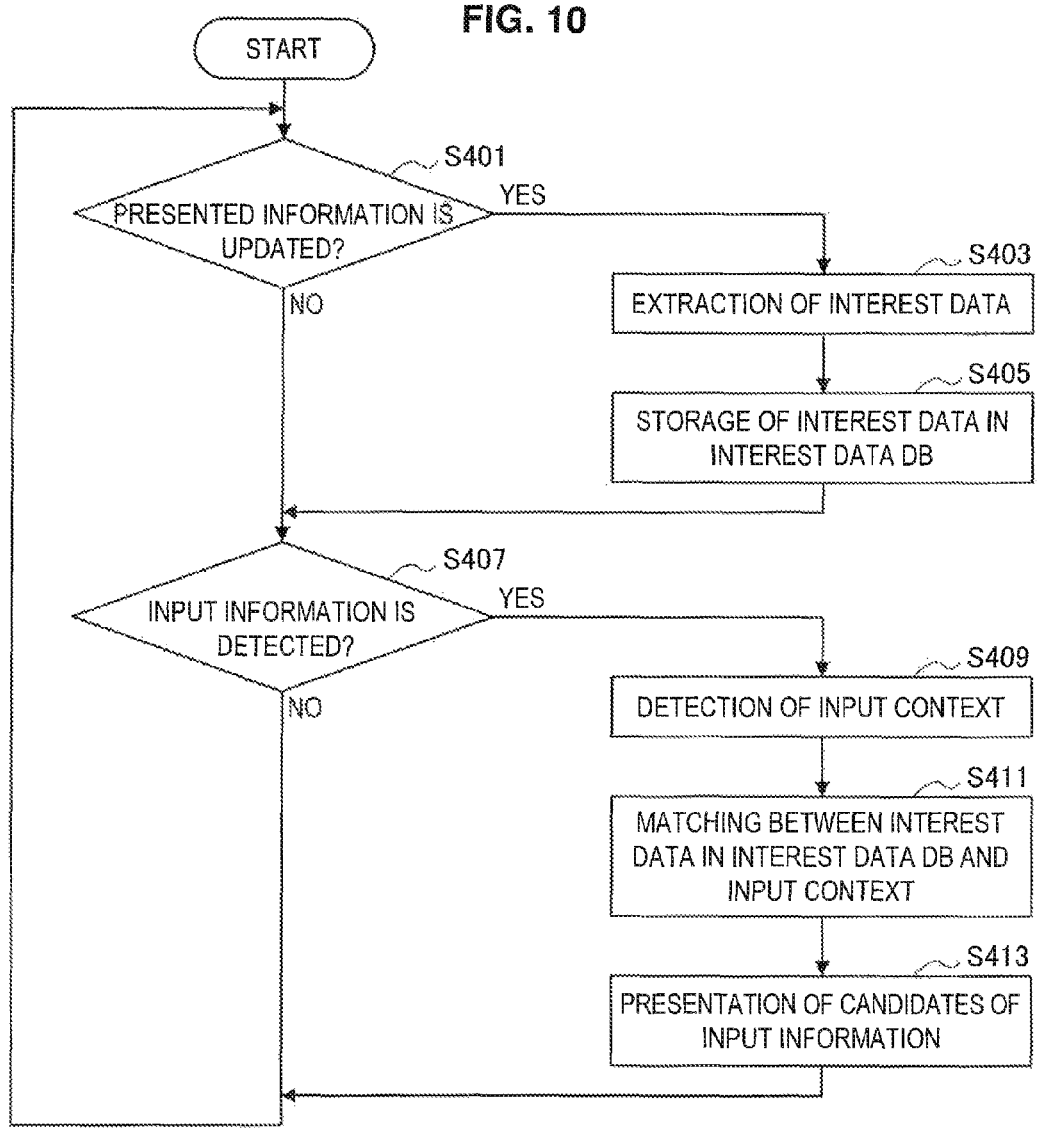
FIG. 10 is a flowchart showing a procedure of a data input assistance method according to the present embodiment.

A procedure of a data input assistance method according to the present embodiment will be described with reference to FIG. 10. FIG. 10 is a flowchart showing the procedure of the data input assistance method according to the present embodiment.

With reference to FIG. 10, first, whether or not presented information presented to a user is updated during execution of an application is detected by the update detection unit 132 (Step S401). In the case where the update is not detected, the processing proceeds to Step S407 described below.

Meanwhile, in the case where the update is detected, interest data that includes at least information accompanying the presented information whose update has been detected and is information on a target in which the user is interested during execution of the application is extracted by the interest data extraction unit 133 (Step S403). Note that the interest data may be any information as long as the information is information on a target in which the user is interested, and the interest data extraction unit 133 can extract, as the interest data, various kinds of information on a target in which the user is interested.

The interest data extracted in Step S403 is stored in the interest data DB 210 (Step S405). Note that, in the interest data DB 210, the interest data may be stored in association with various kinds of information related to the interest data. The various kinds of information related to the interest data may be, for example, an acquisition time, an information source, the kind of information, the hit number, and the like of the interest data. Note that extraction of the interest data in Step S403 and storage of the interest data in Step S405 are performed every time when the presented information is updated. Therefore, the interest data stored in the interest data DB 210 is updated and the interest data DB 210 may manage history of the interest data.

Then, the application controller 131 detects whether or not the input information that is attempted to be inputted during execution of the application is detected (Step S407). In the case where the update is detected, input context indicating a processing status of input information using the application is detected by the input context detection unit 134, the input information being attempted to be inputted during execution of the application (Step S409). Note that the input context may be any information as long as the information is information on the input information, and the input context detection unit 134 can detect various kinds of information on the input information as the input context.

When the input context is detected, the interest data matching unit 221 performs matching processing for selecting interest data matching with the detected input context from the interest data DB (Step S411). In the matching processing, by comparing the various kinds of information included in the input context with the interest data and the information related to the interest data, interest data matching with the input context is selected as matching candidates. Further, in the matching processing, the interest data matching unit 221 may calculate scores for determining priority of matching candidates as the input information candidates.

Then, the input information candidates that are candidates of the input information among the interest data are presented by control of the input information candidate presentation unit 135 on the basis of the detected input context (Step S413). Specifically, the input information candidates are presented among the interest data by the control of the input information candidate presentation unit 135 on the basis of results of the matching processing in Step S411. The user can smoothly input data by selecting desired input information from the presented input information candidates.

After the user inputs the data, the processing returns to Step S401, and the series of processing shown in FIG. 10 is repeated. Further, also in the case where the update is not detected in Step S407, the processing returns to Step S401, and the series of processing shown in FIG. 10 is repeated.

In the above description, the procedure of the data input assistance method according to the present embodiment has been described with reference to FIG. 10. Note that the flow shown in FIG. 10 is an example of the procedure of the data input assistance method according to the present embodiment and the processing in the steps does not need to be executed in order shown in FIG. 10. For example, the series of processing in Steps S401 to Step S405 are also performed as necessary during the processing in other steps. In other words, interest data may be extracted and stored as necessary even while input context is being detected and input information candidates are being presented. This is because input information and input information candidates are also presented information and can be a target from which interest data is extracted.

<4. Hardware Configuration>

Figure 11:
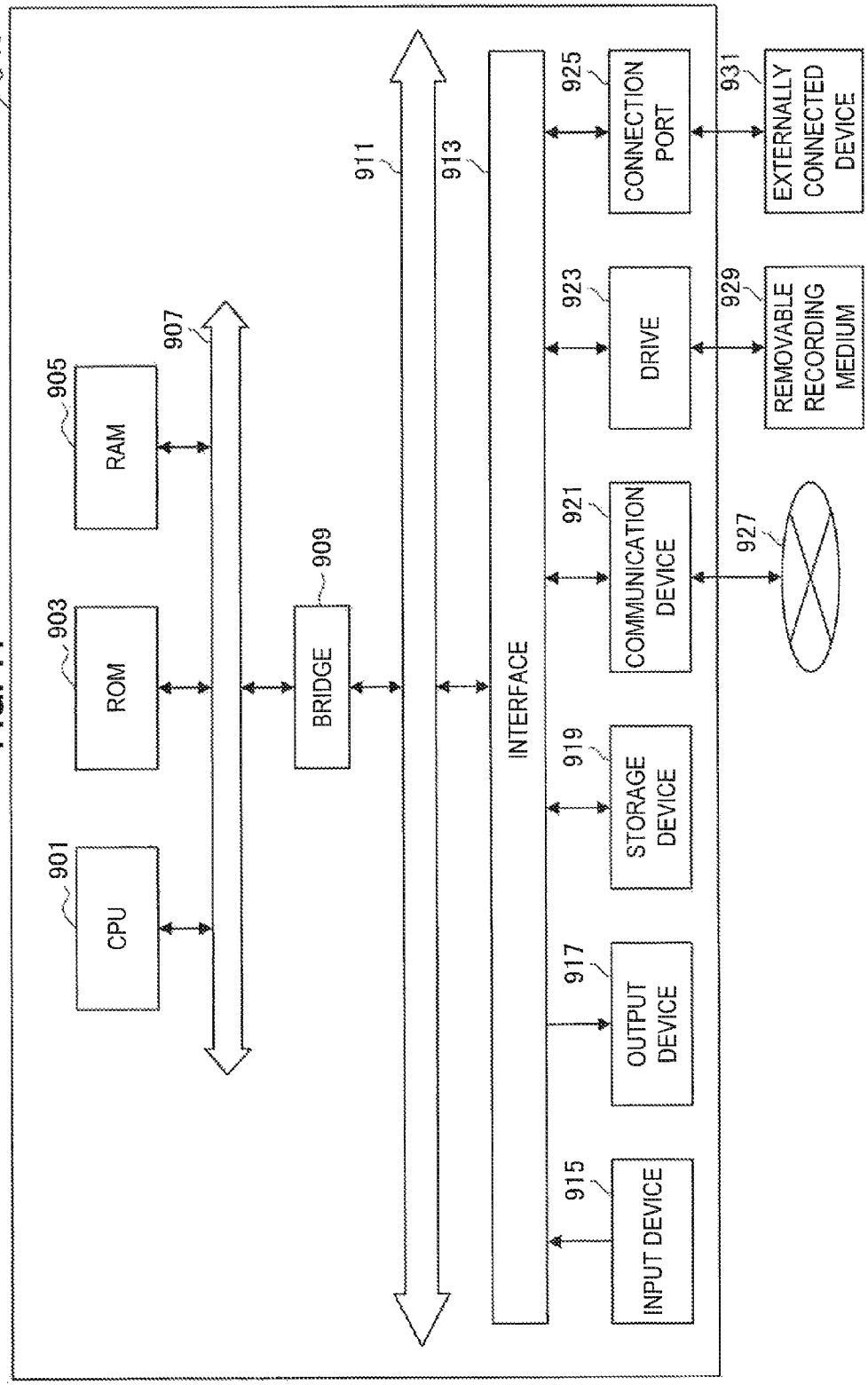
FIG. 11 is a block diagram for explaining a hardware configuration of an information processing apparatus and a server according to an embodiment of the present disclosure.

Next, a hardware configuration of the information processing apparatus 10 and the server 20 according to an embodiment of the present disclosure will be described in detail with reference to FIG. 11. FIG. 11 is a block diagram for explaining a hardware configuration of the information processing apparatus 10 and the server 20 according to the embodiment of the present disclosure.

The information processing apparatus 10 and the server 20 are primarily equipped with a CPU 901, ROM 903, and RAM 905. Also, the information processing apparatus 10 and the server 20 are additionally equipped with a host bus 907, a bridge 909, an external bus 911, an interface 913, an input device 915, an output device 917, a storage device 919, a communication device 921, a drive 923, and a connection port 925.

The CPU 901 functions as a computational processing apparatus and a control device, and controls all or part of the operation in the information processing apparatus 10 and the server 20 by following various programs recorded in the ROM 903, the RAM 905, the storage device 919, or a removable recording medium 929. The ROM 903 stores information such as programs and computational parameters used by the CPU 901. The RAM 905 temporarily stores information such as programs used by the CPU 901, and parameters that change as appropriate during the execution of a program. These memory units are connected to each other by a host bus 907 realized by an internal bus, such as a CPU bus. The CPU 901, the ROM 903, and the RAM 905 corresponds to the controller 130 and the server controller 220 shown in FIG. 1 in the present embodiment, for example.

The host bus 907 is connected to the external bus 911 such as a Peripheral Component Interconnect/Interface (PCI) bus via the bridge 909.

The input device 915 is an operating mechanism operated by a user, such as a mouse, a keyboard, a touch panel, or one or more buttons, switches, and levers, for example. In addition, the input device 915 may also be remote control mechanism utilizing infrared or some other electromagnetic wave (also referred to as a remote), and may also be an externally connected device 931 such as a mobile phone or PDA associated with the operation of the information processing apparatus 10 and the server 20, for example. Furthermore, the input device 915 is made up of an input control circuit or the like, which generates an input signal on the basis of information input by a user using the above operating mechanism, and outputs the generated input signal to the CPU 901, for example. By operating the input device 915, a user of the information processing apparatus 10 and the server 20 is able to input various data and instruct the information processing apparatus 10 and the server 20 to perform processing operations, for example. The input device 915 corresponds to the input unit 110 shown in FIG. 1 in the present embodiment, for example.

The output device 917 is realized by a device capable of visually or aurally reporting acquired information to a user. Such a device may be a display device such as a CRT display device, a liquid crystal display device, a plasma display device, an EL display device, or indicator lights, an audio output device such as one or more speakers and headphones, a printer, or the like. The output device 917 outputs results obtained by various processes conducted by the information processing apparatus 10 and the server 20, for example. Specifically, a display device visually displays results obtained by various processes conducted by the information processing apparatus 10 and the server 20 in various forms, such as text, images, table, charts, and so on. On the other hand, an audio output device aurally outputs an analog signal converted from an audio signal made up of played-back audio data, acoustic data, or the like. The output device 917 corresponds to the output unit 120 in the present embodiment, for example.

The storage device 919 is a device used for data storage, realized as an example of the memory in the information processing apparatus 10 and the server 20. In the present embodiment, the storage device 919 corresponds to the interest data DB 210 shown in FIG. 1, for example. The storage device 919 may be a magnetic storage device such as a hard disk drive (HDD), a semiconductor storage device, an optical storage device, or a magneto-optical storage device, for example. This storage device 919 stores various kinds of information to be processed in the data input assistance processing according to the present embodiment, such as programs and various kinds of data to be executed by the CPU 901. For example, the storage device 919 stores history of the interest data extracted by the interest data extraction unit 133.

Further, although not clearly shown in FIG. 1, the information processing apparatus 10 and the server 20 according to the present embodiment may further include the following configuration members.

The communication device 921 is a communication interface realized by a communication device that connects to a communication network 927, for example. The communication device 921 is a device such as a wired or wireless local area network (LAN), Bluetooth (registered trademark), or Wireless USB (WUSB) communication card, for example. The communication device 921 may also be an optical communication router, an asymmetric digital subscriber line (ADSL) router, or a modem for any of various types of communication. Such a communication device 921 is able to transmit and receive signals or other information to and from the Internet or another communication device in accordance with a given protocol such as TCP/IP, for example. Also, the communication network 927 connected to the communication device 921 may be realized by a network or the like connected in a wired or wireless manner, and may be the Internet, a home LAN, infrared communication, radio-wave communication, or satellite communication, for example. In the present embodiment, the information processing apparatus 10 and the server 20 communicate with each other via the communication device 921 and the network 927 and can therefore transmit/receive various kinds of information such as interest data, input context, and matching results. Further, the information processing apparatus 10 may install various kinds of applications or communicate the various kinds of information to be processed by the applications via the communication device 921.

The drive 923 is a reader/writer for a recording medium, and is internally housed inside, or externally attached to, the information processing apparatus 10 and the server 20. The drive 923 reads out information recorded onto the removable recording medium 929 such as an inserted magnetic disk, optical disc, magneto-optical disc, or semiconductor memory, and outputs such information to the RAM 905, for example. In addition, the drive 923 is also capable of writing and recording information onto the removable recording medium 929 such as an inserted magnetic disk, optical disc, magneto-optical disc, or semiconductor memory. The removable recording medium 929 is an instance of DVD media, HID-DVD media, or Blu-ray media (registered trademark), for example. The removable recording medium 929 may also be a medium such as a CompactFlash (CF; registered trademark), flash memory, or Secure Digital (SD) memory card. Also, the removable recording medium 929 may be an integrated circuit (IC) card mounted with a contactless IC chip, or some other electronic equipment, for example. In the present embodiment, various kinds of information to be processed by various kinds of applications installed in the information processing apparatus 10 and various kinds of information to be processed in the data input assistance processing may be written into and read out from the removable recording medium 929 by the drive 923.

The connection port 925 is a port for directly connecting a device to the information processing apparatus 10 and the server 20. Examples of the connection port 925 include a Universal Serial Bus (USB) port, an IEEE 1394 port, and a Small Computer System Interface (SCSI) port. Other examples of the connection port 925 include an RS-232C port, an optical audio socket, or a High-Definition Multimedia Interface (HDMI) (a registered trademark) port. By connecting the externally connected device 931 to the connection port 925, the information processing apparatus 10 and the server 20 are able to acquire various data directly from the externally connected device 931, and provide various data to the externally connected device 931. In the present embodiment, the various kinds of information to be processed by various kinds of applications installed in the information processing apparatus 10 and various kinds of information to be processed in the data input assistance processing may be transmitted to and received from the externally connected device 931 via the connection port 925.

The above thus illustrates an example of a hardware configuration able to realize the functions of the information processing apparatus 10 and the server 20 according to an embodiment of the present disclosure. Each of the above structural elements may be realized using general-purpose members, but may also be realized in hardware specialized in the function of each structural element. Consequently, it is possible to appropriately modify the hardware configuration to be used according to the technological level at the time of carrying out the present embodiment.

Note that it is also possible to develop a computer program for realizing the respective functions of the information processing apparatus 10 and the server 20 according to the present embodiment as discussed above, and implement the server 10 and the user client 20 with a personal computer or the like. In addition, a computer-readable recording medium storing such a computer program may also be provided. The recording medium may be a magnetic disc, an optical disc, a magneto-optical disc, or flash memory, for example. Furthermore, the above computer program may also be delivered via a network, for example, without using a recording medium.

<5. Conclusion>

In the above description, the present embodiment can obtain the following effects.

In the present embodiment, update of presented information presented to a user during execution of an application is detected by the update detection unit 132, and interest data that includes at least information accompanying the presented information whose update has been detected and is information on a target in which a user is interested during execution of the application is extracted by the interest data extraction unit 133. As described above, in the present embodiment, because the interest data is extracted by using update of presented information as a trigger, the interest data is extracted in terms of whether or not a user is interested and is shared even between different applications or data having different data formats.

Further, in the present embodiment, input context indicating a processing status of input information using an application is detected by the input context detection unit 134, the input information being attempted to be inputted during execution of the application, and control to present input information candidates that are candidates of the input information among the interest data is performed on the basis of the input text by the input information candidate presentation unit. As described above, because input information candidates are presented among the interest data shared between different applications, for example, interest data extracted in a certain application can be presented as an input information candidate in another application. Further, in the present embodiment, not only presented information but also information accompanying the presented information are extracted as interest data, and therefore more data are accumulated as the interest data. Therefore, options from which the input information candidates are selected are further increased. Therefore, a data input assistance system having higher convenience for a user is achieved.

Further, in the present embodiment, input context detected by the input context detection unit 134 may include various kinds of information on input information such as a data format of the input information and the kind of input information. Therefore, in matching processing between input context and interest data, it is possible to narrow down matching candidates under more conditions, and therefore interest data that is more desirable as the input information is presented to a user as input information candidates. This improves convenience for a user.

Further, as described above, in the present embodiment, interest data having different data formats are extracted between different applications, and input information candidates are selected from the interest data. Therefore, even the different applications achieve data input assistance processing associated therebetween. For example, there is assumed a case where an email is prepared and transmitted by a mailer immediately after a comment is posted by a microblog. In the case where posting of a comment and preparation of an email are continuously performed as described above, it is likely that contents of the comment and contents of the email are related to each other. In the data input assistance processing according to the present embodiment, in the case where an email is attempted to be prepared and photo data is attempted to be attached to the email immediately after a comment having contents to which a character string meaning a person's name, a name of a place, and/or the like has been inputted is posted, photos related to the person's name, the name of the place, and/or the like inputted as the contents of the comment are displayed as candidates of the photo data to be attached so as to have higher priority. As described above, in the present embodiment, interest data is transversely extracted between different applications and input information candidates are selected, and therefore data input assistance processing having high convenience for a user is achieved.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, an embodiment in which an acquisition time and the hit number are used to calculate scores for determining priority of input information candidates in matching processing has been described in the above description, but the present embodiment is not limited to this example. A numerical expression considering another element may be used to calculate the scores. Further, in order to calculate the scores, a numerical expression to be used may be changed in accordance with the kind of application executed in the case where input context has been detected (i.e., application to which input information is attempted to be inputted). In the case where different numerical expressions are used for respective applications, numerical expressions considering characteristics of the applications may be set.

Further, for example, the interest data DB 210 according to the present embodiment may statistically manage interest data and perform matching processing with the use of statistics thereof. For example, in the case where a user posts a comment with the use of a microblog, information on a position (GPS), an acquisition time, and the like in which/at which the user posts the comment are statistically managed, and therefore, it is possible to specify a character string that frequently appears in comments posted by the user at a certain time or in a certain location. Further, for example, in the case where the user prepares and transmits an email with the use of a mailer, information on a person whom the user transmits an email is extracted as various kinds of information related to the interest data and is statistically managed, and therefore it is possible to specify a character string that frequently appears in comments which are transmitted by the user to a certain person. The interest data matching unit 221 may perform calculation processing of scores so that such a character string has a high score in the matching processing.

Further, in the above description, an embodiment in which presented information is visually displayed on the display screen of the output unit 120 has been described, but the present embodiment is not limited to this example. For example, the presented information may be sound data which is outputted from the sound output device of the output unit 120 and is aurally presented to a user. For example, in the case where presented information is data related to a musical composition, interest data may include, as information accompanying the presented information, information such as a singer, a composer, and a lyric writer of the musical composition, a genre of the musical composition, and a date (era) at which the musical composition was published. Further, in that case, for example, input context may be information indicating that musical composition data to be played back by a media player is attempted to be inputted, and input information candidates may be presented to a user by matching processing with the interest data.

(1)
An information processing apparatus including:
an update detection unit configured to detect update of presented information presented to a user during execution of an application;
an interest data extraction unit configured to extract interest data that includes at least information accompanying the presented information whose update has been detected and is information on a target in which the user is interested during execution of the application;

an input context detection unit configured to detect input context indicating a processing status of input information using the application, the input information being attempted to be inputted during execution of the application; and an input information candidate presentation unit configured to perform, on the basis of the input context, control to present input information candidates that are candidates of the input information among the interest data.

(2)

The information processing apparatus according to (1), further including:

an interest data matching unit configured to perform matching processing for selecting the interest data matching with the input context from an interest data DB storing history of the extracted interest data, wherein the input information candidate presentation unit presents the input information candidates on the basis of results of the matching processing.

(3)

The information processing apparatus according to (2), wherein the history of the interest data includes at least one piece of information of latest time at which the interest data is extracted, latest time at which the interest data is used as the input information, and the number of times of using the interest data as the input information.

(4)

The information processing apparatus according to (2) or (3), wherein the interest data matching unit calculates scores for determining priority of each of the input information candidates to be selected, the priority being used for presenting the input information candidates.

(5)

The information processing apparatus according to (4), wherein the interest data matching unit performs calculation in a manner that the score of the interest data becomes higher as the number of times of using the interest data as the input information is increased.

(6)

The information processing apparatus according to (4) or (5), wherein the interest data matching unit performs calculation in a manner that the score of the interest data becomes higher as the latest time at which the interest data is used as the input information is closer to a time at which the input context is detected.

(7)

The information processing apparatus according to any one of (4) to (6), wherein the interest data matching unit performs calculation in a manner that the score of the interest data becomes higher as the latest time at which the interest data is extracted is closer to a time at which the input context is detected.

(8)

The information processing apparatus according to any one of (4) to (7), wherein the input information candidate presentation unit presents the input information candidates in order of the priority based on the scores.

(9)

The information processing apparatus according to any one of (1) to (8), wherein the information accompanying the presented information includes metadata associated with the presented information.

(10)

The information processing apparatus according to any one of (1) to (9), wherein the information accompanying the presented information includes information on a processing status of the presented information in the application in which the presented information is presented.

(11)

The information processing apparatus according to any one of (1) to (10), wherein the interest data includes the presented information.

(12)

The information processing apparatus according to any one of (1) to (11), wherein the input context includes information on a data format of the input information.

(13)

The information processing apparatus according to any one of (1) to (12), wherein the input context includes information on a kind of information of the input information.

(14)

The information processing apparatus according to any one of (1) to (13), wherein the interest data includes a character string that is presented while an application having a function of inputting text data is being executed.

(15)

The information processing apparatus according to any one of (1) to (14), wherein the interest data includes at least one piece of information of a location where a photo is taken, a date at which the photo is taken, and a character string indicating an arbitrary term or term group included in a label of the photo, each of which is information accompanying the photo that is presented while an application having a function of browsing photos is being executed.

(16)

The information processing apparatus according to any one of (1) to (15), wherein the input context includes information indicating that a term starting with a predetermined first letter is attempted to be inputted, the information being detected while an application having a function of inputting the text data is being executed.

(17)

The information processing apparatus according to any one of (1) to (16), wherein the input context includes information indicating that photo data is attempted to be inputted, the information being detected while an application having a function of inputting photo data is being executed.

(18)

A data input assistance method including:

detecting update of presented information presented to a user during execution of an application;

extracting interest data that includes at least information accompanying the presented information whose update has been detected and is information on a target in which the user is interested during execution of the application;

detecting input context indicating a processing status of input information using the application, the input information being attempted to be inputted during execution of the application; and performing, on the basis of the input context, control to present input information candidates that are candidates of the input information among the interest data.

(19) A program causing a computer to realize:

a function of detecting update of presented information presented to a user during execution of an application;

a function of extracting interest data that includes at least information accompanying the presented information whose update has been detected and is information on a target in which the user is interested during execution of the application;

a function of detecting input context indicating a processing status of input information using the application, the input information being attempted to be inputted during execution of the application; and a function of performing, on the basis of the input context, control to present input information candidates that are candidates of the input information among the interest data.

REFERENCE SIGNS LIST 1 data input assistance system
10 information processing apparatus
20 server
110 input unit
120 output unit
130 controller
131 application controller
132 update detection unit
133 interest data extraction unit
134 input context detection unit
135 input information candidate presentation unit
210 interest data DB
220 server controller
221 interest data matching unit

The invention claimed is:

1. An information processing apparatus comprising:
an update detection unit configured to detect update of presented information presented to a user during execution of an application;
an interest data extraction unit configured to extract interest data that includes at least information accompanying the presented information whose update has been detected and is information on a target in which the user is interested during execution of the application;
an input context detection unit configured to detect input context indicating a processing status of input information using the application, the input information being attempted to be inputted during execution of the application;
an interest data matching unit configured to perform matching processing for selecting the interest data matching with the input context from an interest data DB storing history of the extracted interest data, by calculating a score of the interest data for determining priority of each of one or more input information candidates that are candidates of the input information among the interest data; and
an input information candidate presentation unit configured to perform, on the basis of the input context, control to present the one or more input information candidates based on results of the matching processing,
wherein the one or more input information candidates are presented based on the determined priority, and the score of the interest data is calculated to be higher when a time the interest data is used as the input information, or a time the interest data is extracted, is closer to a time at which the input context is detected, and
wherein the update detection unit, the interest data extraction unit, the input context detection unit, the interest data matching unit and the input information candidate presentation unit are each implemented via at least one processor.

2. The information processing apparatus according to claim 1,
wherein the history of the interest data includes at least one piece of information of latest time at which the interest data is extracted, latest time at which the interest data is used as the input information, and the number of times of using the interest data as the input information.

3. The information processing apparatus according to claim 1,
wherein the interest data matching unit performs calculation in a manner that the score of the interest data becomes higher as the number of times of using the interest data as the input information is increased.

4. The information processing apparatus according to claim 1,
wherein the input information candidate presentation unit presents the one or more input information candidates in order of the priority based on the scores.

5. The information processing apparatus according to claim 1,
wherein the information accompanying the presented information includes metadata associated with the presented information.

6. The information processing apparatus according to claim 1,
wherein the information accompanying the presented information includes information on a processing status of the presented information in the application in which the presented information is presented.

7. The information processing apparatus according to claim 1,
wherein the interest data includes the presented information.

8. The information processing apparatus according to claim 1,
wherein the input context includes information on a data format of the input information.

9. The information processing apparatus according to claim 1,
wherein the interest data includes a character string that is presented while an application having a function of inputting text data is being executed.

10. The information processing apparatus according to claim 1,
wherein the interest data includes at least one piece of information of a location where a photo is taken, a date at which the photo is taken, and a character string indicating an arbitrary term or term group included in a label of the photo, each of which is information accompanying the photo that is presented while an application having a function of browsing photos is being executed.

11. The information processing apparatus according to claim 1,
wherein the input context includes information indicating that a term starting with a predetermined first letter is attempted to be inputted, the information being detected while an application having a function of inputting the text data is being executed.

12. The information processing apparatus according to claim 1,
wherein the input context includes information indicating that photo data is attempted to be inputted, the information being detected while an application having a function of inputting photo data is being executed.

13. A data input assistance method comprising:
detecting update of presented information presented to a user during execution of an application;
extracting interest data that includes at least information accompanying the presented information whose update has been detected and is information on a target in which the user is interested during execution of the application;
detecting input context indicating a processing status of input information using the application, the input information being attempted to be inputted during execution of the application;
performing matching processing for selecting the interest data matching with the input context from an interest data DB storing history of the extracted interest data, by calculating a score of the interest data for determining priority of each of one or more input information candidates that are candidates of the input information among the interest data; and
performing, on the basis of the input context, control to present the one or more input information candidates based on results of the matching processing,
wherein the one or more input information candidates are presented based on the determined priority, and the score of the interest data is calculated to be higher when a time the interest data is used as the input information, or a time the interest data is extracted, is closer to a time at which the input context is detected.

14. A non-transitory computer-readable medium having embodied thereon a program, which when executed by a computer causes the computer to execute a method, the method comprising:
detecting update of presented information presented to a user during execution of an application;
extracting interest data that includes at least information accompanying the presented information whose update has been detected and is information on a target in which the user is interested during execution of the application;
detecting input context indicating a processing status of input information using the application, the input information being attempted to be inputted during execution of the application;
performing matching processing for selecting the interest data matching with the input context from an interest data DB storing history of the extracted interest data, by calculating a score of the interest data for determining priority of each of one or more input information candidates that are candidates of the input information among the interest data; and
performing, on the basis of the input context, control to present the one or more input information candidates based on results of the matching processing,
wherein the one or more input information candidates are presented based on the determined priority, and the score of the interest data is calculated to be higher when a time the interest data is used as the input information, or a time the interest data is extracted, is closer to a time at which the input context is detected.

15. The information processing apparatus according to claim 1, wherein the input context detection unit is further configured to detect a kind of information of the input information, wherein the kind of information of the input information is indicated to be a format of the input information.

16. The information processing apparatus according to claim 15, wherein the format of the input information is at least one of text data, photo data and sound data.

* * * * *